(12) United States Patent
Holloway

(10) Patent No.: US 9,584,020 B2
(45) Date of Patent: Feb. 28, 2017

(54) ADAPTIVE CRITICAL-DUTY-CYCLE CLAMP FOR POWER CONVERTERS

(71) Applicant: Fairchild Semiconductor Corporation, San Jose, CA (US)

(72) Inventor: Rendon Holloway, San Jose, CA (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 136 days.

(21) Appl. No.: 14/614,915

(22) Filed: Feb. 5, 2015

(65) Prior Publication Data
US 2015/0222186 A1 Aug. 6, 2015

Related U.S. Application Data

(60) Provisional application No. 61/935,891, filed on Feb. 5, 2014.

(51) Int. Cl.
*H02M 3/158* (2006.01)
*H02M 3/07* (2006.01)
*H02M 1/00* (2006.01)

(52) U.S. Cl.
CPC .............. *H02M 3/158* (2013.01); *H02M 3/07* (2013.01); *H02M 2001/007* (2013.01)

(58) Field of Classification Search
CPC ... H02M 3/07; H02M 3/158; H02M 2001/007
See application file for complete search history.

(56) References Cited

U.S. PATENT DOCUMENTS

| | | | | |
|---|---|---|---|---|
| 7,265,606 B1* | 9/2007 | Suzuki | ................. | H03K 17/063 327/390 |
| 7,511,977 B2* | 3/2009 | Oyama | ................... | H02M 3/07 307/109 |
| 7,880,530 B2* | 2/2011 | Ishiyama | ................ | H02M 3/07 327/536 |
| 2013/0020960 A1* | 1/2013 | Ren | ......................... | H02M 3/07 315/224 |
| 2014/0001856 A1* | 1/2014 | Agamy | ................. | H02M 3/155 307/43 |
| 2014/0084890 A1* | 3/2014 | Philip | ................... | H02M 1/146 323/284 |

* cited by examiner

*Primary Examiner* — Matthew Nguyen
(74) *Attorney, Agent, or Firm* — Grossman Tucker Perreault & Pfleger PLLC

(57) ABSTRACT

Devices and methods provide a duty cycle clamping device for preventing an output voltage of a power converter from decreasing as the duty cycle of a pulse width modulation (PWM) signal driving the power converter increases, the clamping device including duty cycle clamping circuitry configured to determine a critical duty cycle for the PWM signal based on an input voltage, a top voltage of a flying capacitor and a bottom voltage of the flying capacitor, and configured to clamp an actual duty cycle of the PWM signal at the critical duty cycle if a desired duty cycle exceeds the critical duty cycle.

20 Claims, 6 Drawing Sheets

ADAPTIVE CRITICAL-DUTY-CYCLE CLAMP FOR POWER CONVERTERS

PRIORITY

The present U.S. Non-provisional patent application claims the benefit of U.S. Provisional Patent Application No. 61/935,891 entitled "Adaptive Critical-Duty-Cycle Clamp for Power Converters" with a filing date of Feb. 5, 2014. The contents of the above-identified U.S. Provisional Patent Application are incorporated by reference herein.

FIELD

The present disclosure relates to DC-DC power converters, and more particularly, to DC-DC power converters using a flying capacitor.

BACKGROUND

DC-DC power converters can be used to convert a first voltage to a second voltage that may be higher or lower than the first voltage. Typically, a duty cycle of a pulse width modulation (PWM) signal driving an output stage of the power converter may be controlled by control logic to regulate the output voltage, and increasing the duty cycle of the PWM signal may cause the output stage of the power converter to generate an increased output voltage. However, if the DC-DC power converter includes a flying capacitor, there is a critical duty cycle above which increasing the duty cycle results in a decrease in the output voltage. To avoid this, some control logic may clamp the duty cycle at a fixed value representing the worst case scenario to prevent a decrease in the output voltage. However, the actual critical duty cycle varies depending on operating conditions, and the fixed value may limit the operating range of the power converter.

BRIEF DESCRIPTION OF THE DRAWINGS

Features and advantages of the claimed subject matter will be apparent from the following detailed description of some example embodiments consistent therewith, which description should be considered with reference to the accompanying drawings, wherein:

Although the following Detailed Description will proceed with reference being made to some illustrative example embodiments, many alternatives, modifications, and variations thereof will be apparent to those skilled in the art.

DETAILED DESCRIPTION

Generally, the present disclosure provides devices and/or methods for controlling a duty cycle of a PWM signal generated to drive an output stage of a power converter including a flying capacitor to properly regulate an output voltage.

Figure 1:
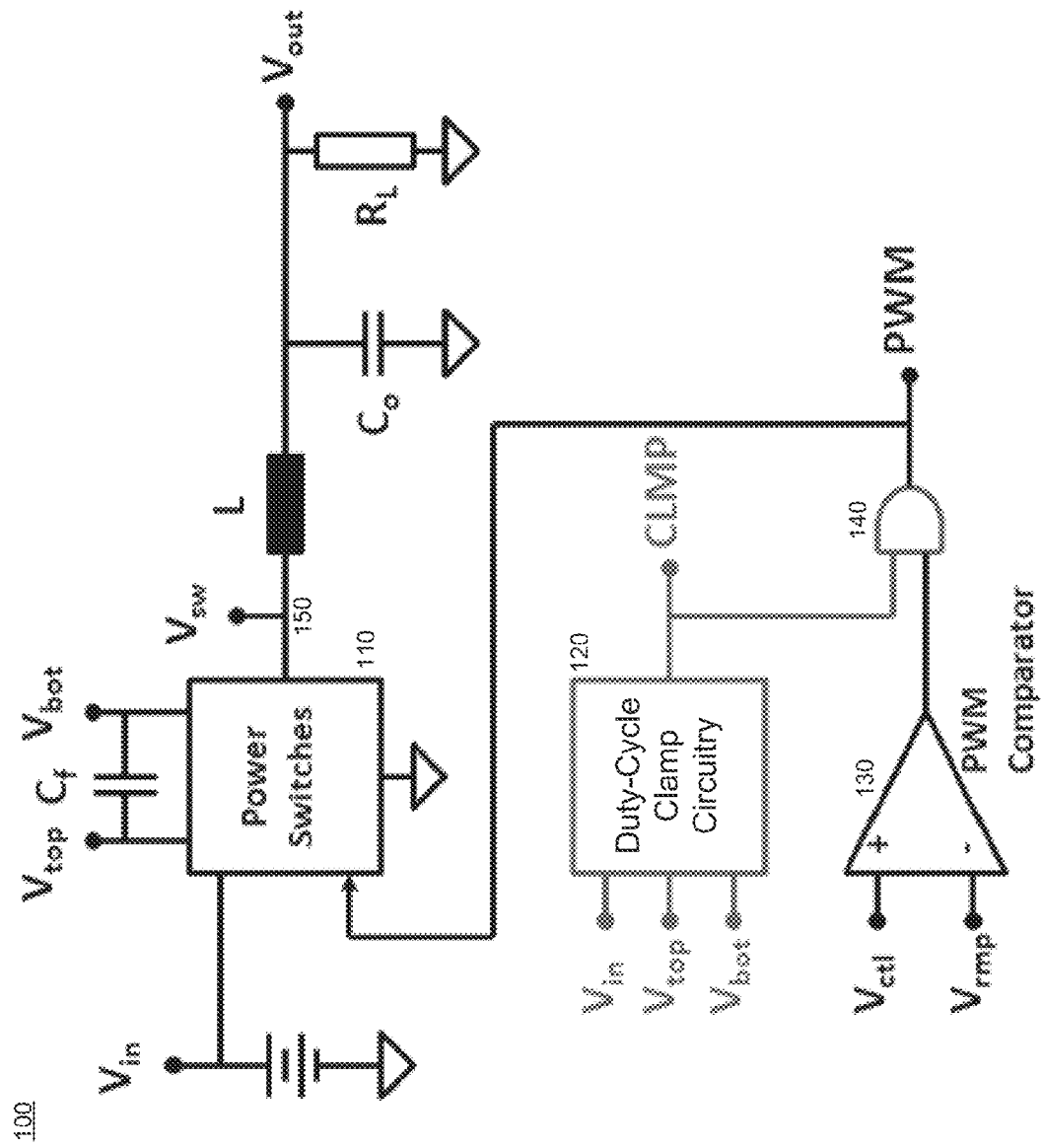
FIG. 1 illustrates a simplified power converter including duty-cycle clamping circuitry, according to some example embodiments.

FIG. 1 illustrates a simplified power converter 100 including duty-cycle clamping circuitry 120, according to some example embodiments. The power converter 100 may be configured to convert an input voltage Vin to an output voltage Vout that is higher or lower than the input voltage Vin. For example, a high reference potential of power switches 110 may be equal to the input voltage Vin or a sum of the input voltage Vin and a voltage across a flying capacitor Cf, and a low reference potential may be equal to the input voltage Vin or ground. During a pump state of the power switches 110, an inductor L may be coupled to the high reference potential at a switch node 150 situated between the power switches 110 and the inductor L, the switch node 150 having a corresponding switch voltage Vsw as shown in FIG. 1, and during a charge state of the power switches 110 the inductor L may be coupled to the low reference potential. By controlling a duty cycle, which is a percentage of a time interval that the output voltage Vout is coupled to the high reference potential relative to a total period, the power converter 100 may regulate the output voltage Vout. The duty cycle is a characteristic of a PWM signal, which can be expressed as a quantity between the values of 0 and 1, with a value of 0 indicating that the PWM signal causes the power switches 110 to couple the output voltage Vout to the low reference potential for the entire time interval and a value of 1 indicating that the PWM signal causes the power switches 110 to couple the output voltage Vout to the high reference potential for the entire time interval.

During the charge state of the power switches 110, the operation of the power switches 110 places the flying capacitor Cf in parallel with the input voltage Vin. Ideally, the flying capacitor Cf is charged up to the input voltage Vin, although the voltage across the charged capacitor Cf may be affected by the duration of the charge state and/or other operating conditions. During the pump state of the power switches 110, the operation of the power switches 110 places the flying capacitor Cf in series with the input voltage Vin so that ideally twice the input voltage is available as the high reference potential. The high reference potential may be coupled to the inductor L, an output capacitor Cout and a load resistor RL during the pump state.

Typically, increasing the duty cycle of the PWM signal driving the power switches 110 increases the output voltage Vout, as the inductor L is coupled to the high reference potential for a longer period of time during the pump state. However, increasing the duty cycle also decreases the charge state, which decreases the period of time over which the flying capacitor Cf is allowed to charge. Thus, there is a critical duty cycle above which increasing the duty cycle results in a decrease in the output voltage Vout as the high reference potential is decreasing due to the voltage across the flying capacitor Cf not being charged to the input voltage Vin.

To avoid exceeding the critical duty cycle, and therefore reducing the output voltage Vout, the duty cycle of the PWM signal driving power switches 110 may be limited to below a fixed value representing a worst case scenario (e.g., to a duty cycle just before the output voltage would start to drop). However, the critical duty cycle may vary depending on operating conditions. Given altered operating conditions, increasing the duty cycle beyond a fixed value determined based on an original operating condition may still allow the output voltage Vout to increase, so limiting the duty cycle to the fixed value may unnecessarily limit the operating range of the power converter 100. Therefore, to increase the operating range of the power converter 100 without exceeding the critical duty cycle, the power converter 100 may include duty-cycle clamping circuitry 120.

The duty-cycle clamping circuitry 120 may receive the input voltage Vin, a top voltage Vtop of the flying capacitor Cf and a bottom voltage Vbot of the flying capacitor Cf and generate an output CLMP. The duty-cycle clamping circuitry 120 may cause the duty cycle of the PWM signal driving the power converter 100 to be "clamped" (e.g., maintained) at the critical duty cycle to avoid the output voltage Vout decreasing. The duty-cycle clamping circuitry 120 is adaptive, and may generate the critical duty cycle based on the instantaneous value of the top voltage Vtop and the bottom voltage Vbot of the flying capacitor Cf. The output CLMP may be input to an AND gate 140 along with an output of a PWM comparator 130 used to generate the PWM signal for driving power converter 100.

The PWM comparator 130 may compare a control voltage Vctl to a ramp voltage Vrmp to generate a PWM signal having a certain duty cycle for driving power switches 110. For example, if the control voltage Vctl is greater than the ramp voltage Vrmp, the PWM comparator 130 may generate a logic high signal. If the control voltage Vctl is less than the ramp voltage Vrmp, the PWM comparator 130 may generate a logic low signal. Thus, the PWM comparator 130 may generate a PWM signal having a certain duty cycle based on the intersection of the control voltage Vctl and the ramp voltage Vrmp.

If the critical duty cycle of the PWM signal output by the duty cycle clamping circuitry 120 is greater than the duty cycle of the PWM signal generated by the PWM comparator 130, the AND gate 140 may output a PWM signal based on the duty cycle generated by the PWM comparator 130. However, if the critical duty cycle of the PWM signal output by the duty-cycle clamping circuitry 120 is less than the duty cycle of the PWM signal generated by the PWM comparator 130, the AND gate 140 may output a PWM signal based on the critical duty cycle, thus clamping the output of the AND gate 140 at the critical duty cycle.

The power converter 100 may include several different topologies. For example, in a buck-up topology, the low reference potential may be coupled to the input voltage Vin, whereas in a voltage-doubling-buck topology, the low reference potential may be coupled to ground. Both the buck-up and voltage-doubling-buck topologies may include a voltage doubling configuration. In either topology, the flying capacitor Cf in operation may effectively double the input voltage, extending the state-of-charge range over which a single-cell lithium-ion battery may be used (e.g., especially when the battery charge is low). The buck-up topology is more efficient in that it couples the switch-node (e.g., the terminal of inductor L coupled to the power switches 110) to the input voltage during the charge phase for charging the flying capacitor Cf, whereas in the voltage-doubling-buck topology the switch-node is coupled to ground during the charge phase. A disadvantage of the buck-up topology is that implementations may require a more complex modulator (not shown). In the charge phase, energy is transferred from the battery, or another input power source, to the flying capacitor Cf where it is stored as potential energy (e.g., static charge) in the electric field of the flying capacitor Cf. In the pump phase, the potential energy is transferred from the flying capacitor Cf to the inductor L for storage as kinetic energy (e.g., moving charge or electric current) in the magnetic field of the inductor L. The load may then accept energy from the inductor on a demand (e.g., as-needed) basis. In the buck-up configuration, the clamping circuitry 120 may be configured to determine the critical duty cycle based on a difference between a top voltage of the flying capacitor Cf and a bottom voltage of the flying capacitor Cf divided by the input voltage. In the voltage-doubling-buck configuration, the clamping circuitry 120 may be configured to determine the critical duty cycle based on a sum of the input voltage and a difference between the top and bottom voltages of the flying capacitor Cf divided by twice the input voltage.

Figure 2:
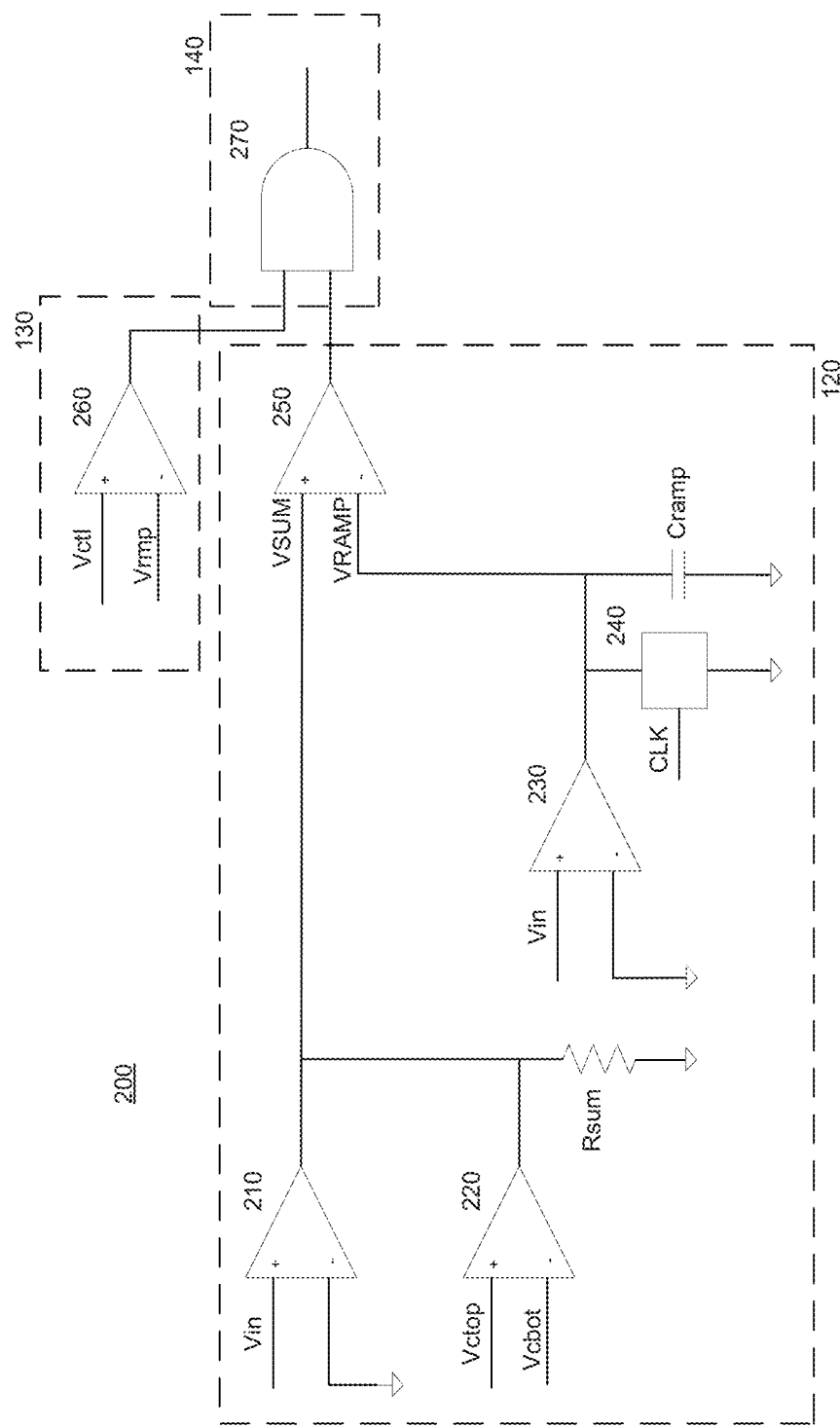
FIG. 2 illustrates a detailed circuit diagram of duty-cycle clamping circuitry, according to some example embodiments.

FIG. 2 is a detailed circuit diagram of duty-cycle clamping circuitry 200, according to some example embodiments. The clamping circuitry 200 may include a first voltage controlled current source 210 and a second voltage controlled current source 220, which may comprise, for example, transconductance amplifiers. The first voltage controlled current source 210 may generate a first current based on a difference between the input voltage Vin and ground, and the second voltage controlled current source 220 may generate a second current based on a difference between a top voltage Vctop of the flying capacitor Cf and a bottom voltage Vcbot of the flying capacitor Cf. The first current and the second current may both flow through a sum resistor Rsum, creating a sum voltage Vsum across the sum resistor Rsum based on a sum of the input voltage Vin and a voltage across the flying capacitor. Therefore, the sum resistor Rsum may convert the currents into a voltage. Example embodiments are not limited thereto, however, and some example embodiments may vary. The general intent is to have the sum voltage Vsum be based on a total voltage across the flying capacitor Cf and the input voltage.

The clamping circuitry 200 may also include a third voltage controlled current source 230 that may generate a third current based on a difference between the input voltage Vin and ground. The third current may charge a ramp capacitor Cramp to create a ramp voltage Vramp having a ramp waveform. Once a clock cycle, reset element 240 may couple the ramp capacitor Cramp to ground to reset the ramp voltage Vramp. The reset element 240 may be a voltage controlled switch configured to reset the ramp waveform at a desired frequency. The gain of the third voltage controlled current source 230 may control a slope of the ramp voltage Vramp, so the gain of the third voltage controlled current source 230 may be different than a gain of the first voltage controlled current source 210 and the second voltage controlled current source 220.

A first comparator 250 may compare the sum voltage Vsum to the ramp voltage Vramp to generate a PWM signal with the critical duty cycle. For example, if the sum voltage Vsum is greater than the ramp voltage Vramp, the first comparator 250 may generate a logic high signal. If the sum voltage Vsum is less than the ramp voltage Vramp, the first comparator 250 may generate a logic low signal. Thus, the first comparator 250 may generate a PWM signal with the critical duty cycle based on the intersection of the sum voltage Vsum and the ramp voltage Vramp.

Similar to the PWM comparator 130 discussed with regard to FIG. 1, a second comparator 260 may compare a control voltage Vctl to a second ramp voltage Vrmp to generate a duty cycle. The second ramp voltage Vrmp may be, for example, a sawtooth, triangle or other type of wave typically used for driving a PWM-based voltage converter. For example, if the control voltage Vctl is greater than the second ramp voltage Vrmp, the second comparator 260 may generate a logic high signal. If the control voltage Vctl is less than the second ramp voltage Vrmp, the second comparator 260 may generate a logic low signal. Thus, the second comparator 260 may generate a PWM signal having a duty cycle based on the intersection of the control voltage Vctl and the ramp voltage Vrmp.

Similar to the AND gate 140 illustrated in FIG. 1, a first AND gate 270 may generate a PWM signal with the critical duty cycle generated by the first comparator 250 or the PWM signal generated by the second comparator 260. For example, if the PWM signal generated by the first comparator 250 is greater than the PWM signal generated by the second comparator 260, the first AND gate 270 may output a PWM signal with the duty cycle generated by the second comparator 250. However, if the PWM signal generated by the first comparator 250 is less than the duty cycle generated by the second comparator 260, the first AND gate 270 may output a PWM signal with the critical duty cycle, thus clamping the output of the first AND gate 270 at the critical duty cycle.

Figure 3:
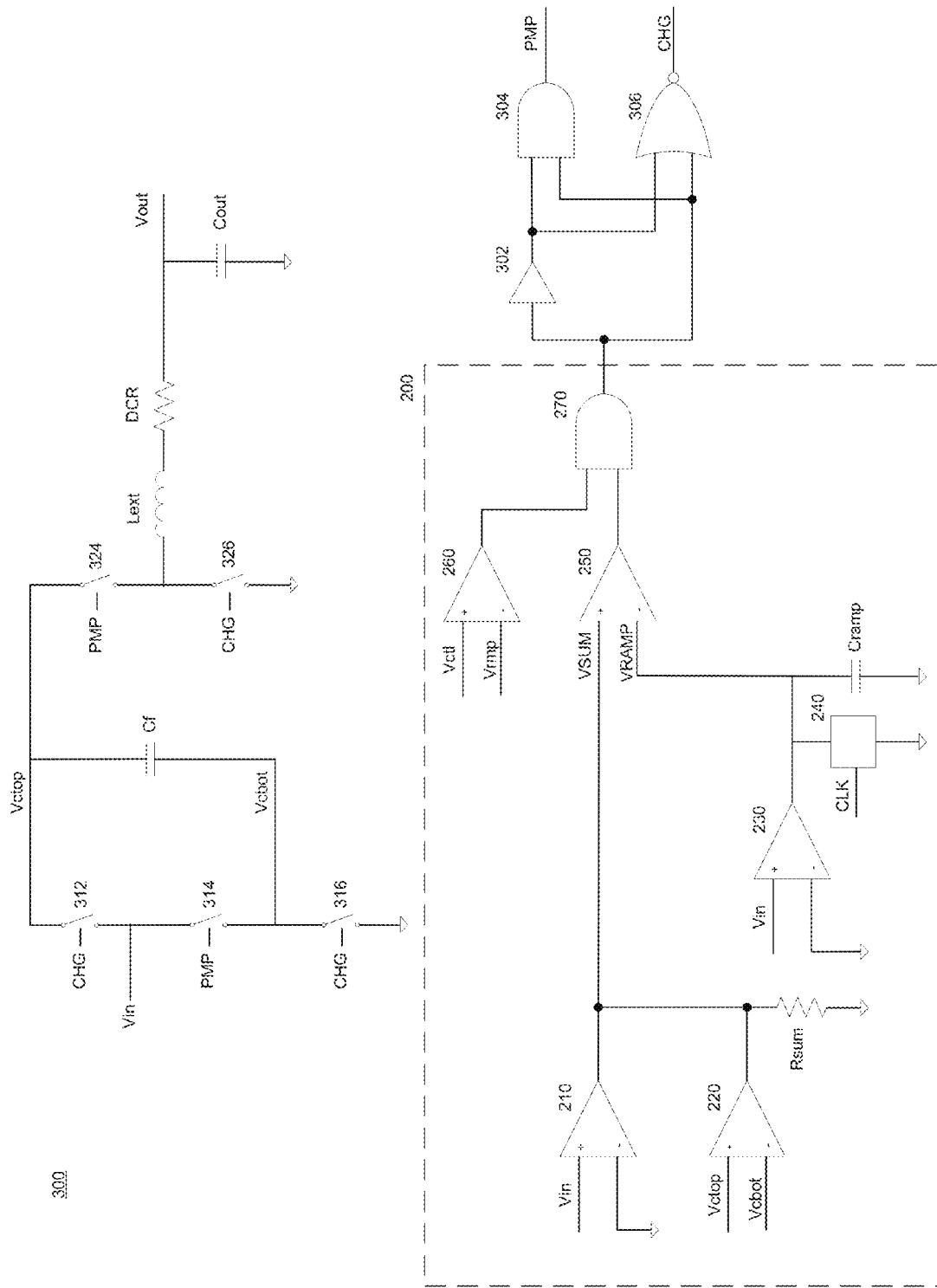
FIG. 3 illustrates a circuit diagram of a power converter including the duty-cycle clamping circuitry of FIG. 2, according to some example embodiments.

FIG. 3 is a circuit diagram of a power converter 300 including the duty-cycle clamping circuitry 200 of FIG. 2, according to some example embodiments. In general, the type, nature and function of the components included in the duty-cycle clamping circuitry 200 are the same as the corresponding components discussed with regard to FIG. 2, and detailed descriptions of these components are therefore not reiterated for the sake of brevity.

The power converter 300 may be configured to convert an input voltage Vin to an output voltage Vout that is higher or lower than the input voltage Vin. To do this, the power converter 300 may use a flying capacitor Cf to generate a high reference potential Vctop that may be equal to a sum of the input voltage Vin and a voltage across the flying capacitor Cf. In addition, a low reference potential may be equal to the input voltage Vin or ground. During a pump state of the power converter 300, an inductor Lext may be coupled to the high reference potential Vctop, and during a charge state of the power converter 300, the inductor Lext may be coupled to the low reference potential. By controlling a duty cycle, which is a percentage of time that the output voltage Vout is coupled to the high reference potential Vctop relative to a total switching period, the power converter 300 may regulate the output voltage Vout. The duty cycle is a characteristic of a PWM signal, which can be expressed as a quantity between the value of 0 and 1, with a value of 0 indicating that the power converter 300 couples the output voltage Vout to the low reference potential for the entire time interval and D=1 indicating that the power converter 300 couples the output voltage Vout to the high reference potential Vctop for the entire time interval.

During the charge state of the power converter 300, a first switch 312 and a third switch 316 may conduct while a second switch 314 does not conduct, placing the flying capacitor Cf in parallel with the input voltage Vin. Ideally, a voltage across the flying capacitor Cf is charged to the input voltage Vin during the charge state, although the length of the charge state and other operating conditions affect the voltage across the flying capacitor Cf. A fourth switch 324 may not conduct while a fifth switch 326 may conduct, coupling the inductor Lext to the low reference potential during the charge state. The low reference potential may be the input voltage Vin or ground depending on the configuration of the power converter 300. For example, in a buck-up topology, the low reference potential may be the input voltage Vin, whereas in a voltage-doubling buck topology, illustrated in FIG. 3, the low reference potential may be ground.

During the pump state of the power converter 300, the first switch 312 and the third switch 316 may not conduct while the second switch 314 may conduct, placing the flying capacitor Cf in series with the input voltage Vin. Therefore, the high reference potential Vctop may be equal to a sum of the input voltage Vin and the voltage across the flying capacitor Cf. The fourth switch 324 may conduct while the fifth switch 326 may not conduct, coupling the inductor Lext to the high reference potential Vctop in the pump state. Ideally, the high reference potential Vctop will be twice the input voltage Vin. The inductor Lext includes a DC resistance DCR, and the inductor Lext and an output capacitor Cout help regulate the output voltage Vout.

Typically, increasing the duty cycle of the PWM signal driving the power converter 300 causes the output voltage Vout to increase, as the inductor Lext is coupled to the high reference potential Vctop for a longer period of time during the pump state. However, increasing the duty cycle of the PWM signal driving the power converter 300 also increases the duration of the pump state. This decreases the duration of the charge state, reducing the amount of time allowed for the flying capacitor Cf to charge. Thus, there is a critical duty cycle above which increasing the duty cycle results in a decrease in the output voltage Vout as the high reference potential Vctop is decreasing due to the voltage across the flying capacitor Cf not being fully charged to the input voltage Vin.

As discussed above with regard to FIG. 2, the clamping circuitry 200 may clamp the duty cycle of the PWM signal driving the power converter 300 at the critical duty cycle to avoid the output voltage Vout decreasing. The clamping circuitry 200 is adaptive and may generate the critical duty cycle based on the actual high reference potential Vctop. The output of the clamping circuitry 200 may be based on the critical duty cycle of the PWM signal generated by the first comparator 250 and the duty cycle of the PWM signal generated by the second comparator 260. For example, if the critical duty cycle generated by the first comparator 250 is greater than the duty cycle generated by the second comparator 260, the first AND gate 270 may output a PWM signal with the duty cycle generated by second comparator 260. However, if the critical duty cycle of the PWM signal generated by the first comparator 250 is less than the duty cycle of the PWM signal generated by the second comparator 260, the first AND gate 270 may output the PWM signal with the critical duty cycle generated by first comparator 250 and not the PWM signal generated by the second comparator 260, thus clamping the output of the first AND gate 270 at the critical duty cycle.

The output of the first AND gate 270 may be coupled to a buffer 302, a second AND gate 304 and a NOR gate 306, and the output of the buffer 302 may be coupled to the second AND gate 304 and the NOR gate 306.

The second AND gate 304 may control a pump signal to the second switch 314 and the fourth switch 324, such that a high logic signal output by the second AND gate 304 places the power converter 300 in the pump state. Because the second AND gate 304 may output a logic high signal only when the output of the first AND gate 270 and the buffer 302 are logic high signals, a delay time between when the output of the first AND gate 270 becomes a logic high signal and when the output of the buffer 302 becomes a logic high signal may create a dead time prior to the pump state.

Similarly, the NOR gate 306 may control a charge signal to first switch 312, third switch 316 and fifth switch 326, such that a high logic signal output by the NOR gate 306 places the power converter 300 in the charge state. In contrast to the second AND gate 304, the NOR gate 306 may output a logic high signal only if neither the output of the first AND gate 270 and the buffer 302 is a logic high signal, which can also be expressed as when the output of the first AND gate 270 and the buffer 302 are both logic low signals. Therefore, the delay time between when the output of the first AND gate 270 becomes a logic low signal and when the output of the buffer 302 becomes a logic low signal may create a dead time prior to the charge state.

As a result, the power converter 300 may have a dead time between the charge state and the pump state that is controlled by the delay time of the buffer 302.

Figure 4:
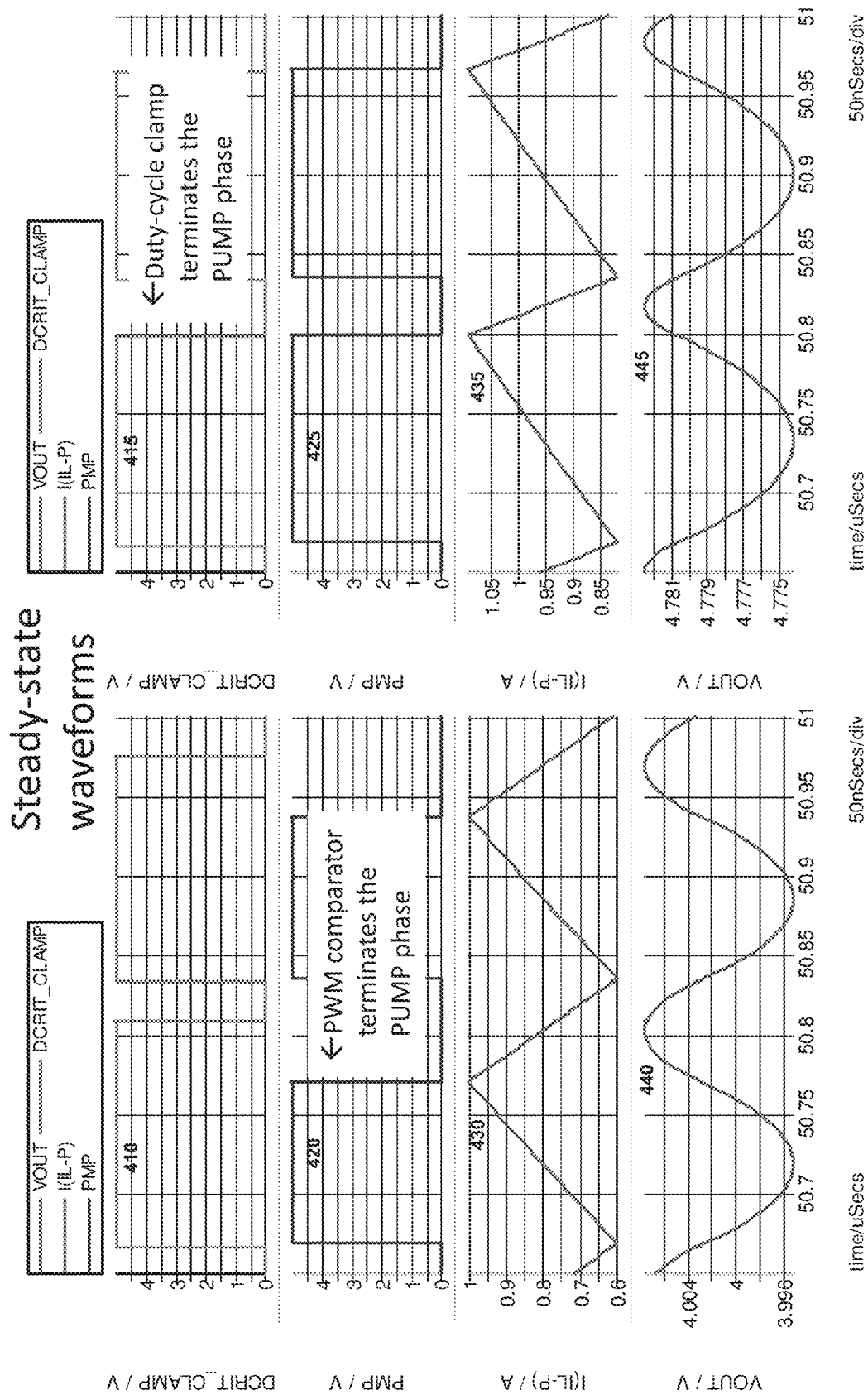
FIG. 4 illustrates an example of static duty-cycle-to-output-voltage transfer characteristics according to some example embodiments.

FIG. 4 is an example of voltage waveforms according to some example embodiments. On the left side, a PWM signal with the critical duty cycle 410 of the pump state is larger than the of a desired PWM signal duty cycle, so an actual duty cycle of PWM signal 420 of the pump state is based on the desired duty cycle waveform, with a resulting inductor current waveform 430 and output voltage waveform 440. On the right side, the PWM signal with the critical duty cycle waveform 415 of the pump state is smaller than the desired duty cycle waveform, so the actual duty cycle of PWM signal 425 of the pump state is clamped at the critical duty cycle 415, with a resulting inductor current waveform 435 and output voltage waveform 445. Note that FIG. 4 illustrates example values for the voltage waveforms, but example embodiments are not limited thereto and the voltage waveforms and current waveforms may vary.

Figure 5:
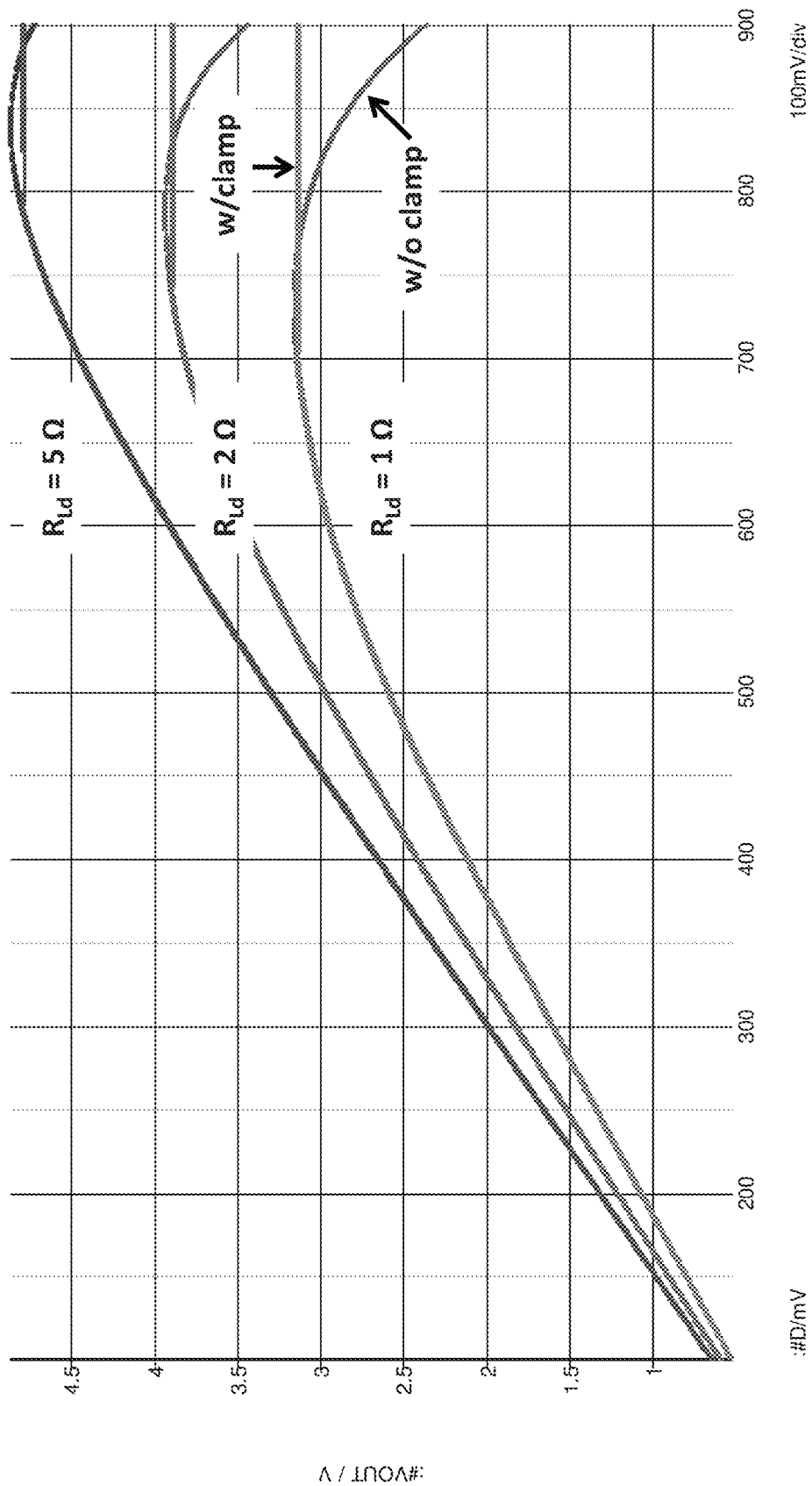
FIG. 5 illustrates an example of voltage waveforms according to some example embodiments.

FIG. 5 is an example of static duty-cycle-to-output-voltage transfer characteristics according to some example embodiments. FIG. 5 illustrates an output voltage for varying loads increasing as the duty cycle of the PWM signal driving power converter 100 increases, until the duty cycle reaches a critical duty cycle. After the critical duty cycle, increasing the duty cycle of the PWM signal decreases the output voltage, as discussed above, for example due to insufficient charging of a flying capacitor Cf. Instead of increasing the duty cycle of the PWM signal past the critical duty cycle, and therefore decreasing the output voltage, some example embodiments may clamp the duty cycle of the PWM signal driving the power converter 100 at the critical duty cycle and have a steady output voltage.

Figure 6:
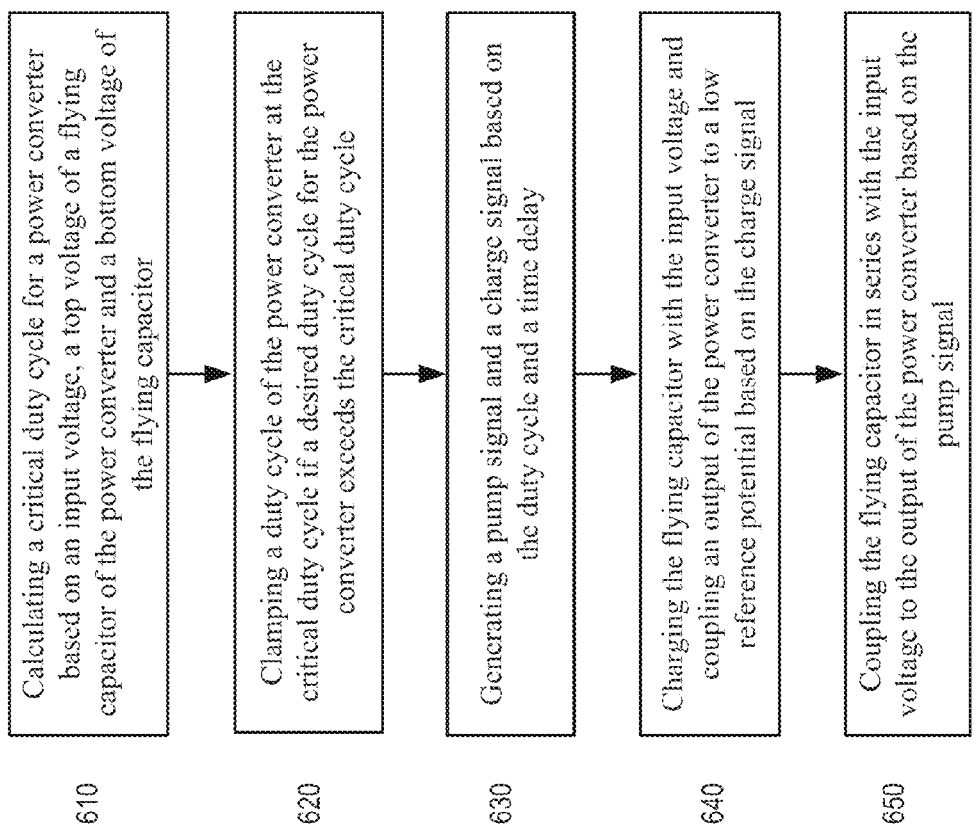
FIG. 6 illustrates a flowchart of operations according to some example embodiments of the present disclosure.

FIG. 6 illustrates a flowchart of operations according to some example embodiments of the present disclosure. At operation 610, a critical duty cycle for PWM signal driving a power converter is determined based on an input voltage, a top voltage of a flying capacitor of the power converter and a bottom voltage of the flying capacitor. At operation 620, a duty cycle of the PWM signal is clamped at a critical duty cycle if the desired duty cycle for the power converter exceeds the critical duty cycle. At operation 630, a pump signal and a charge signal are generated based on the duty cycle of the PWM signal and a time delay. At operation 640, the flying capacitor is charged using the input voltage, and an output of the power converter is coupled to a low reference potential, based on the charge signal. Finally, at operation 650 the flying capacitor is coupled in series with the input voltage to the output of the power converter, based on the pump signal.

"Circuitry", as used in any embodiment herein, may comprise, for example, singly or in any combination, hardwired circuitry, programmable circuitry, state machine circuitry, and/or firmware that stores instructions executed by programmable circuitry.

The example embodiments discussed above are based on analog circuitry. However, example embodiments are not limited thereto, and some example embodiments may be based on digital circuitry or digital logic. For example, some example embodiments may include a microprocessor.

Similarly, the example embodiments discussed above are based on a third order converter, but example embodiments are not limited thereto. For example, some example embodiments may be based on a second order converter or a fourth order converter or any power converter that exhibits a critical duty cycle.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A duty cycle clamping device, comprising:
 duty cycle clamping circuitry configured to determine a critical duty cycle for a pulse-width-modulation (PWM) signal to drive a power converter using an input voltage, a top voltage of a flying capacitor based on the input voltage and the voltage across the flying capacitor, and a bottom voltage of the flying capacitor based on the input voltage or ground; and
 a PWM comparator configured to generate the PWM signal with a desired duty cycle for driving the power converter.

2. The clamping device of claim 1, wherein the clamping circuitry is further configured to clamp a duty cycle of the PWM signal at the critical duty cycle if the desired duty cycle exceeds the critical duty cycle.

3. The clamping device of claim 1, wherein the clamping circuitry is further configured to determine the critical duty cycle each control cycle of the power converter.

4. The clamping device of claim 1, wherein the clamping circuitry is further configured to adaptively determine the critical duty cycle of the power converter.

5. The clamping device of claim 1, wherein the clamping circuitry is further configured to determine the critical duty cycle based on a difference between the top voltage of the flying capacitor and the bottom voltage of the flying capacitor divided by the input voltage if the power converter includes a buck-up configuration.

6. The clamping device of claim 5, wherein a switch voltage in the power converter is coupled to the input voltage during a charge mode of the power converter in the buck-up configuration.

7. The clamping device of claim 1, wherein the clamping circuitry is further configured to determine the critical duty cycle based on a sum of the input voltage and a difference between the top voltage of the flying capacitor and the bottom voltage of the flying capacitor, divided by twice the input voltage, if the power converter includes a voltage-doubling-buck configuration.

8. The clamping device of claim 7, wherein a switch voltage in the power converter is coupled to a low reference potential during a charge mode of the power converter in the voltage doubling configuration.

9. The clamping device of claim 1, wherein the clamping circuitry further comprises:
a first comparator configured to compare a critical voltage to a first ramp voltage to generate a PWM signal having the critical duty cycle, the critical voltage based on a sum of the input voltage and a difference between the top voltage of the flying capacitor and the bottom voltage of the flying capacitor; and
a first AND gate coupled to the outputs of the first comparator and the PWM comparator, the first AND gate configured to output a logic high signal if the outputs of the first comparator and the PWM comparator are both logic high signals, wherein the PWM comparator is configured to compare a control voltage to a second ramp voltage to generate a PWM signal having the desired duty cycle.

10. The clamping device of claim 9, wherein the clamping circuitry further comprises:
a first voltage controlled current source configured to generate a first current based on a difference between the input voltage and a low reference potential;
a second voltage controlled current source configured to generate a second current based on a difference between the top voltage of the flying capacitor and the bottom voltage of the flying capacitor; and
a resistor coupled to the first voltage controlled current source and the second voltage controlled current source, wherein the critical voltage is a voltage across the resistor based on the first current and the second current.

11. The clamping device of claim 10, wherein the clamping circuitry further comprises:
a third voltage controlled current source configured to generate a third current based on a difference between the input voltage and a low reference potential;
a ramp capacitor configured to store charge based on the third current, the first ramp voltage being a voltage across the ramp capacitor; and
reset circuitry configured to couple the ramp capacitor to ground once a clock cycle.

12. The clamping device of claim 1, further comprising:
a buffer coupled to an output of the clamping circuitry;
a second AND gate coupled to an output of the buffer and the output of the clamping circuitry, the second AND gate configured to generate a pump signal; and
a NOR gate coupled to the output of the buffer and the output of the clamping circuitry, the NOR gate configured to generate a charge signal, wherein a dead time occurring when both the pump signal and the charge signal are logic low signals is based on a delay time of the buffer.

13. The clamping device of claim 12, wherein
the pump signal is configured to control at least one high switch in the power converter, the at least one high switch coupled to the top voltage of the flying capacitor, and
the charge signal is configured to control at least one low switch in the power converter, the at least one low switch coupled between the high switch and a low reference potential.

14. A power converter, the power converter comprising:
a flying capacitor having a top voltage and a bottom voltage;
switch circuitry configured to couple the flying capacitor in parallel with an input voltage based on a charge signal and to couple the flying capacitor in series with the input voltage based on a pump signal;
a high switch coupled to the top voltage of the flying capacitor;
a low switch coupled between the high switch and a low reference potential;
duty cycle clamping circuitry configured to determine a critical duty cycle for a pulse-width-modulation (PWM) signal to drive the power converter using the input voltage, a top voltage of the flying capacitor based on the input voltage and the voltage across the flying capacitor, and a bottom voltage of the flying capacitor based on the input voltage or ground; and
a PWM comparator configured to generate the PWM signal with a desired duty cycle for driving the power converter.

15. A method of controlling a duty cycle of a pulse-width-modulation (PWM) signal for driving a power converter, the method comprising:
determining a critical duty cycle for the PWM signal using an input voltage, a top voltage of a flying capacitor in the power converter based on the input voltage and the voltage across the flying capacitor, and a bottom voltage of the flying capacitor based on the input voltage or ground; and
clamping a duty cycle of the PWM signal for driving the power converter at the critical duty cycle if a desired duty cycle for the PWM signal exceeds the critical duty cycle.

16. The method of claim 15, further comprising:
delaying a PWM signal generated by clamping circuitry in the power converter with a buffer; and
generating a pump signal and a charge signal based on the PWM signal and the delayed PWM signal, wherein a dead time occurring when both the pump signal and the charge signal are logic low signals is based on a delay time of the buffer.

17. The method of claim 16, further comprising:
controlling at least one high switch in the power converter with the pump signal, the at least one high switch coupled to the top voltage of the flying capacitor, and
controlling at least one low switch in the power converter with the charge signal, the at least one low switch coupled between the high switch and a low reference potential.

18. The method of claim 16, further comprising:
charging the flying capacitor with an input voltage based on a charge signal;
coupling the flying capacitor in series with the input voltage to an output of the power converter based on a pump signal.

19. The method of claim 15, wherein the determining of the critical duty cycle is based on a difference between the top voltage of the flying capacitor and the bottom voltage of the flying capacitor divided by the input voltage if a switch node of the power converter is coupled to the input voltage during a charge phase of the power converter.

20. The method of claim 15, wherein the determining is based on a sum of the input voltage and a difference between the top voltage of the flying capacitor and the bottom voltage of the flying capacitor, divided by twice the input voltage, if a switch node of the power converter is coupled to a low reference potential during a charge phase of the power converter.

* * * * *